(12) United States Patent
Ohtsuka

(10) Patent No.: US 6,944,398 B2
(45) Date of Patent: Sep. 13, 2005

(54) PHOTOMETRIC DEVICE AND CAMERA

(75) Inventor: Masanori Ohtsuka, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/006,650

(22) Filed: Dec. 10, 2001

(65) Prior Publication Data

US 2002/0090213 A1 Jul. 11, 2002

(30) Foreign Application Priority Data

Dec. 26, 2000 (JP) .......................... 2000-396214

(51) Int. Cl.$^7$ ............................. G03B 7/08; G03B 3/10
(52) U.S. Cl. ...................................... 396/234; 396/100
(58) Field of Search .................... 396/100, 165, 396/167, 213, 233, 234; 356/221, 222

(56) References Cited

U.S. PATENT DOCUMENTS

| | | | | |
|---|---|---|---|---|
| 4,455,071 A | | 6/1984 | Kato et al. ................. | 354/431 |
| 4,664,495 A | | 5/1987 | Alyfuku et al. ............ | 354/430 |
| 4,862,206 A | * | 8/1989 | Ootsuka et al. ............ | 396/167 |
| 4,907,027 A | | 3/1990 | Kobe et al. ................. | 354/435 |
| 4,969,005 A | * | 11/1990 | Tokunaga .................. | 396/165 |
| 5,319,416 A | * | 6/1994 | Takagi ....................... | 396/100 |
| 5,937,217 A | | 8/1999 | Ohtsuka et al. ............ | 396/310 |
| 2004/0239957 A1 | | 12/2004 | Ohtsuka .................... | 358/1.1 |

FOREIGN PATENT DOCUMENTS

| | | |
|---|---|---|
| JP | 57-122421 | 7/1982 |
| JP | 60-213931 | 10/1985 |
| JP | 61-915524 | 5/1986 |
| JP | 5-64056 | 3/1993 |

* cited by examiner

*Primary Examiner*—David M. Gray
(74) *Attorney, Agent, or Firm*—Fitzpatrick, Cella, Harper & Scinto

(57) ABSTRACT

A photometric device according to the present invention performs the steps of: performing photometry in a first area of an overall area where photometry can be performed; performing photometry in a plurality of second areas, each included in the first area; and when a difference greater than a predetermined value exists among the photometric results in the plurality of second areas, correcting the photometric result in the first area based on the photometric results in the plurality of second areas and determining a backlight state exist based on the corrected photometric result. Alternatively, the photometric device performs the steps of: setting a reference value for determining a backlight state exist based on the difference between the photometric result in the first area and a photometric result in a peripheral area around the first area or a photometric result in the overall area; and when a difference greater than a predetermined value exists among the photometric results in the plurality of second areas, correcting the reference value based on the photometric results in the plurality of second areas. In this manner, partial photometry and spot photometry can be performed at a lower luminance, and a backlight atate can be more accurately determined.

38 Claims, 10 Drawing Sheets

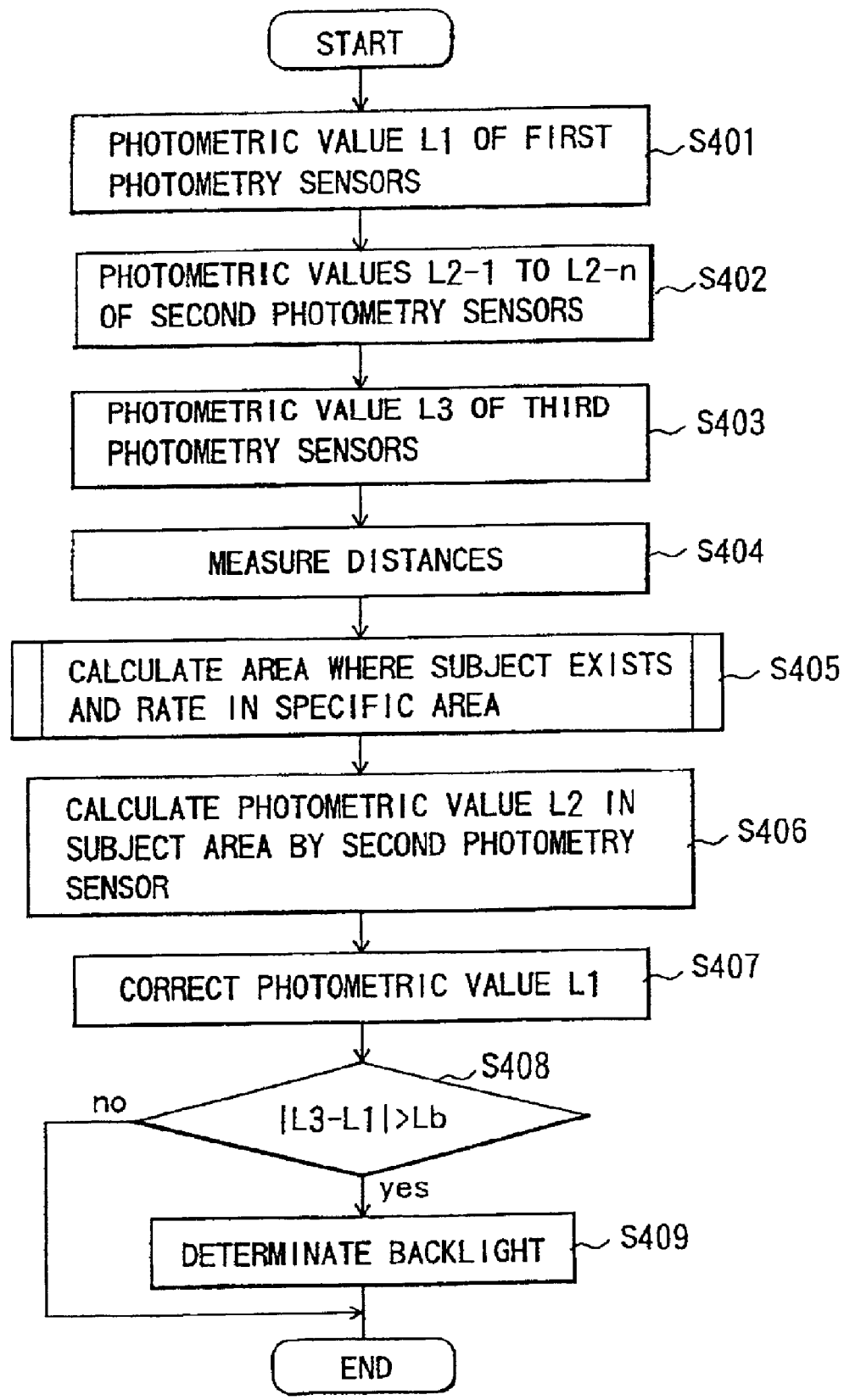

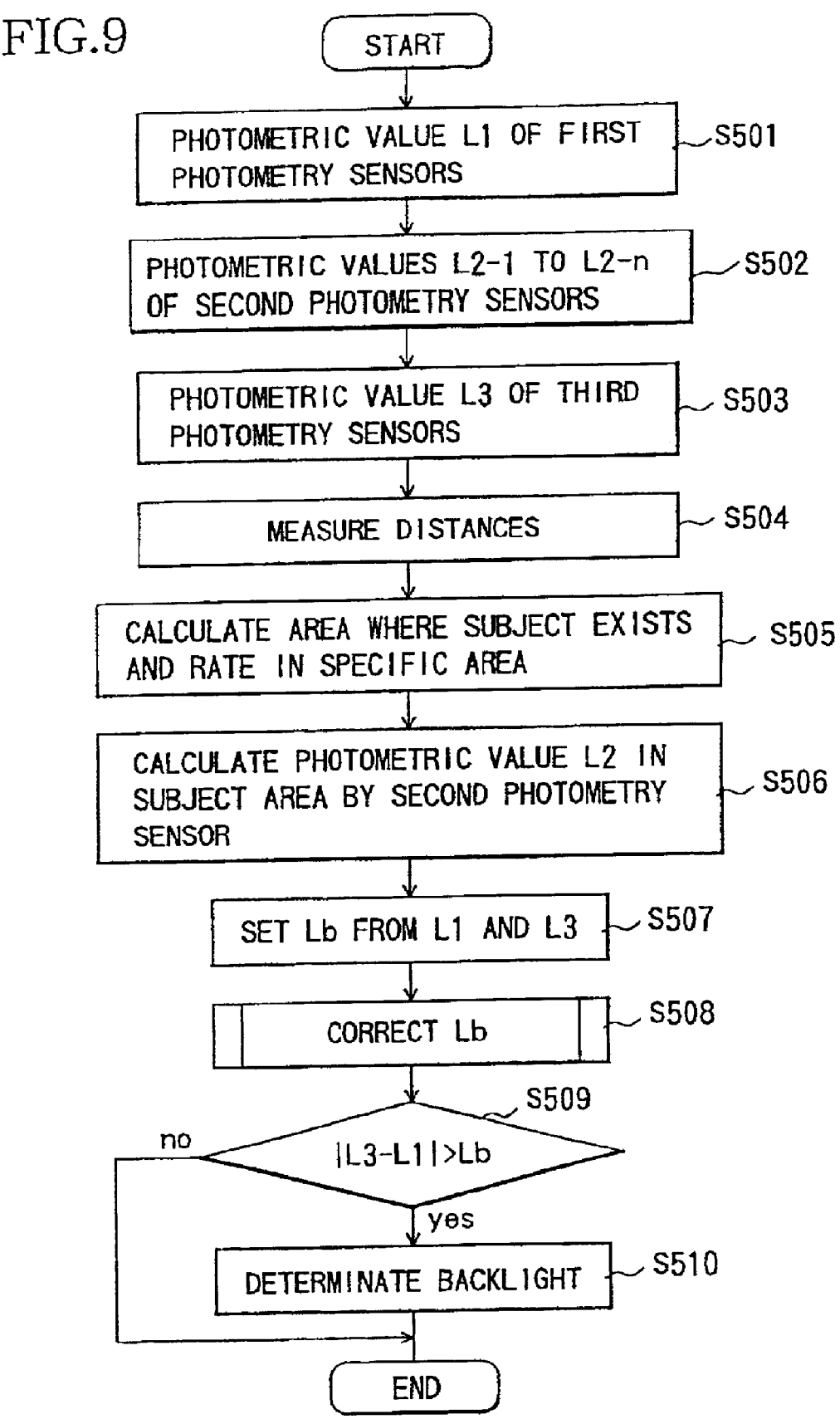

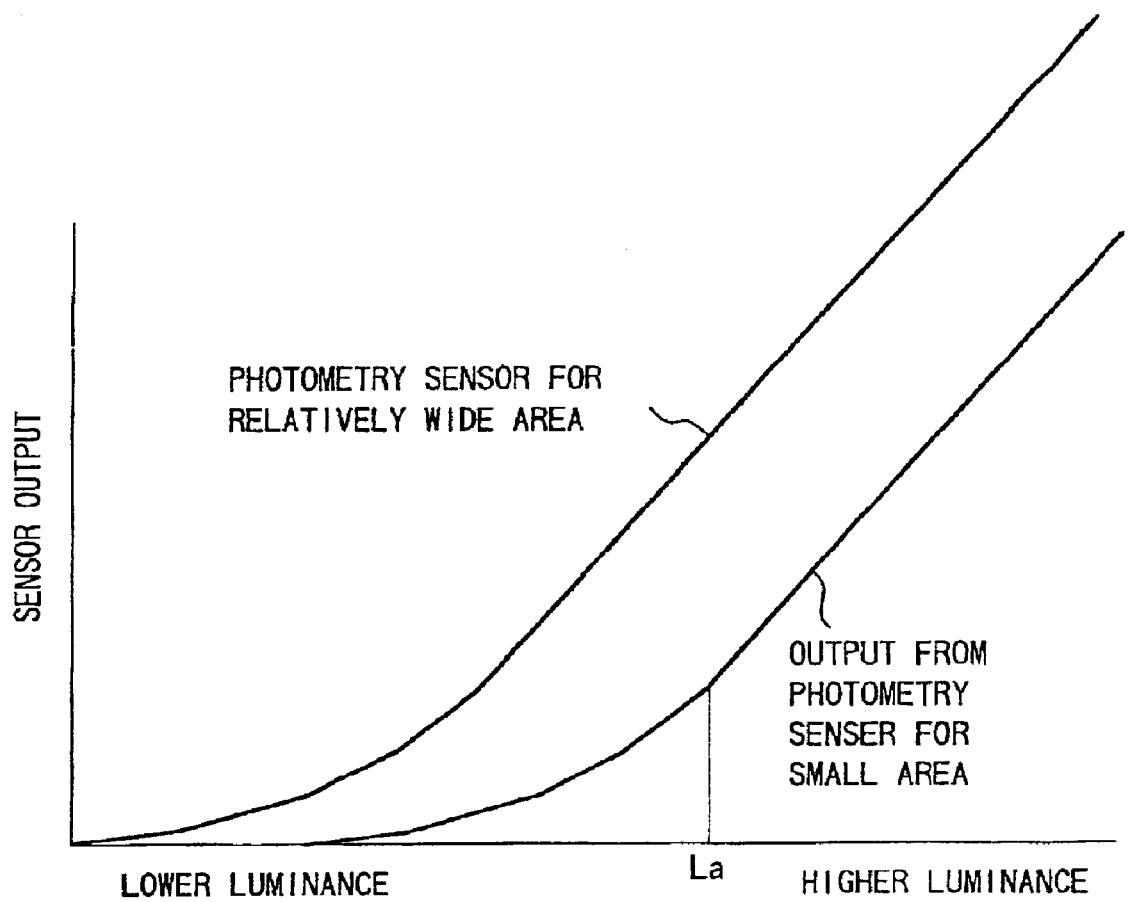

PHOTOMETRIC DEVICE AND CAMERA

BACKGROUND OF THE INVENTION

1. Field of the Invention

The present invention relates to a photometric device provided for a camera or the like, and more particularly to a photometric device capable of determining a backlight situation.

2. Description of the Related Art

In recent years, cameras capable of partial photometry or spot photometry have become widely used, in which luminance is measured in a specific portion of a photographic area and photographs are taken on the basis of the information on the luminance. Since these cameras faithfully reproduce brightness of a portion which a photographer wishes to shoot, they are considerably effective especially when a subject is small or when a great difference exists in luminance between a subject and its surroundings.

Another proposed technique is to measure luminance in a central portion and a peripheral portion of a picture, determine from the difference between them that a scene to be photographed is a backlighted scene when the central portion is dark and the peripheral portion is bright, and correct exposure or take photographs with an electronic flash. This technique can prevent underexposure for a person or a subject in the central portion resulting from a photograph taken with reference to brightness of the overall picture.

Japanese Patent Laid-open No. 57-122421 has proposed a technique of manually changing a ratio of combined outputs of spot photometry for measuring subject luminance in a central portion of a picture and peripheral photometry for measuring luminance in a peripheral portion. With this technique, real time photometry for shutter opening can be performed as intended by a photographer.

Japanese Patent Laid-open No. 61-91524 has proposed a photometric device for detecting a backlight situation by using a difference in output between partial photometry and averaging photometry, in which an area for partial photometry is set to include a portion below the center of a picture. In addition, Japanese Patent Laid-open No. 60-213931 has proposed a technique of performing distance measurement and photometry in a plurality of areas to determine a backlight situation based on a combination of a plurality of the distance and luminance information.

When it is determined whether a subject is backlighted or not, the determination is most readily made if the subject extends over all the area where photometry is performed and its surrounding area where peripheral photometry is performed does not include the subject. To achieve this, an area where photometry is performed is preferably a smaller spot so that the situation of a subject may be more appropriately supported.

As shown in FIG. 10, however, when a photometric sensor performs photometry in a smaller spot (shown by a line "output from photometric sensor for small area" in FIG. 10), a wide dynamic range cannot be ensured, thereby presenting a contradictory problem that the sensor fails to produce an output at a lower luminance, and thereby fails to accurately perform photometry.

As a solution to the problem, the photometric device proposed in Japanese Patent Laid-open No. 61-91524 is designed to have an area for partial photometry including a portion below the center of a picture since a subject is likely to exist in a lower portion of the picture.

In this case, however, the area for partial photometry cannot also be reduced in size in order to allow photometry at a lower luminance in the area for partial photometry. In addition, for an extremely small subject, photometry is performed in an area including a portion other than the subject even when the subject exists in the center. It is thus impossible to accurately detect backlight.

The photometric device proposed in Japanese Patent Laid-open No. 60-213931 performs distance measurement and photometry in a plurality of areas to determine a backlight situation based on a combination of a plurality of the distance and luminance information. In this case, when the plurality of areas serving as photometric areas have a large size, no problem occurs if a subject extends over all the photometric areas, but if a subject extends only over some of the photometric areas, accurate backlight detection is difficult to perform.

SUMMARY OF THE INVENTION

It is an object of the present invention to provide a photometric device capable of performing partial photometry and spot photometry at a lower luminance and more accurately determining a backlight situation, and a camera provided with the photometric device.

To achieve the aforementioned object, the present invention provides a photometric device for performing the steps of:

a) performing photometry in a predetermined area of an overall area where photometry can be performed;

b) performing photometry in a plurality of subareas formed by dividing at least a part of the predetermined area; and c) when a difference greater than a predetermined value exists among the photometric results in the subareas, correcting the photometric result in the predetermined area based on the photometric results in the subareas and determining backlight based on the corrected photometric result.

The present invention also provides a photometric device for performing the steps of:

a) performing photometry in a predetermined area of an overall area where photometry can be performed;

b) setting a reference value for backlight determination based on a difference between the photometric result in the predetermined area and a photometric result in a peripheral area around the predetermined area or a photometric result in the overall area; and c) when a difference greater than a predetermined value exists among photometric results in subareas formed by dividing at least a part of the predetermined area, correcting the reference value based on the photometric results in the subareas.

In addition, the present invention provides a photometric device for performing the steps of:

a) performing photometry in a predetermined area of an overall area where photometry can be performed;

b) determining any of a plurality of subareas including an object for which backlight is determined on the basis of information on measured distance in at least a part of the predetermined area, the plurality of subareas being formed by dividing at least a part of the predetermined area; and c) correcting the photometric result in the predetermined area based on a photometric result in the subarea including the object, and determining backlight based on the corrected photometric result.

Furthermore, the present invention provides a photometric device for performing the steps of:

a) performing photometry in a predetermined area of an overall area where photometry can be performed;

b) setting a reference value for backlight determination based on a difference between the photometric result in the predetermined area and a photometric result in a peripheral area around the predetermined area or a photometric result in the overall area;

c) determining any of a plurality of subareas including an object for which backlight is determined on the basis of information on measured distance in at least a part of the predetermined area, the plurality of subareas being formed by dividing at least a part of the predetermined area; and d) correcting the reference value based on a photometric result in the subarea including the object.

The above and other objects, features and advantages of the invention will become more apparent from the following detailed description taken in conjunction with the accompanying drawings.

BRIEF DESCRIPTION OF THE DRAWINGS

FIG. 8 is a flow chart illustrating the operation of the photometric device according to the fourth embodiment;

FIG. 9 is a flow chart illustrating the operation of a photometric device according to a fifth embodiment; and FIG. 10 is a graphic representation showing outputs from a photometric sensor for a wide area and from a photometric sensor for a small area.

DESCRIPTION OF THE PREFERRED EMBODIMENTS (First Embodiment)

Figure 1:
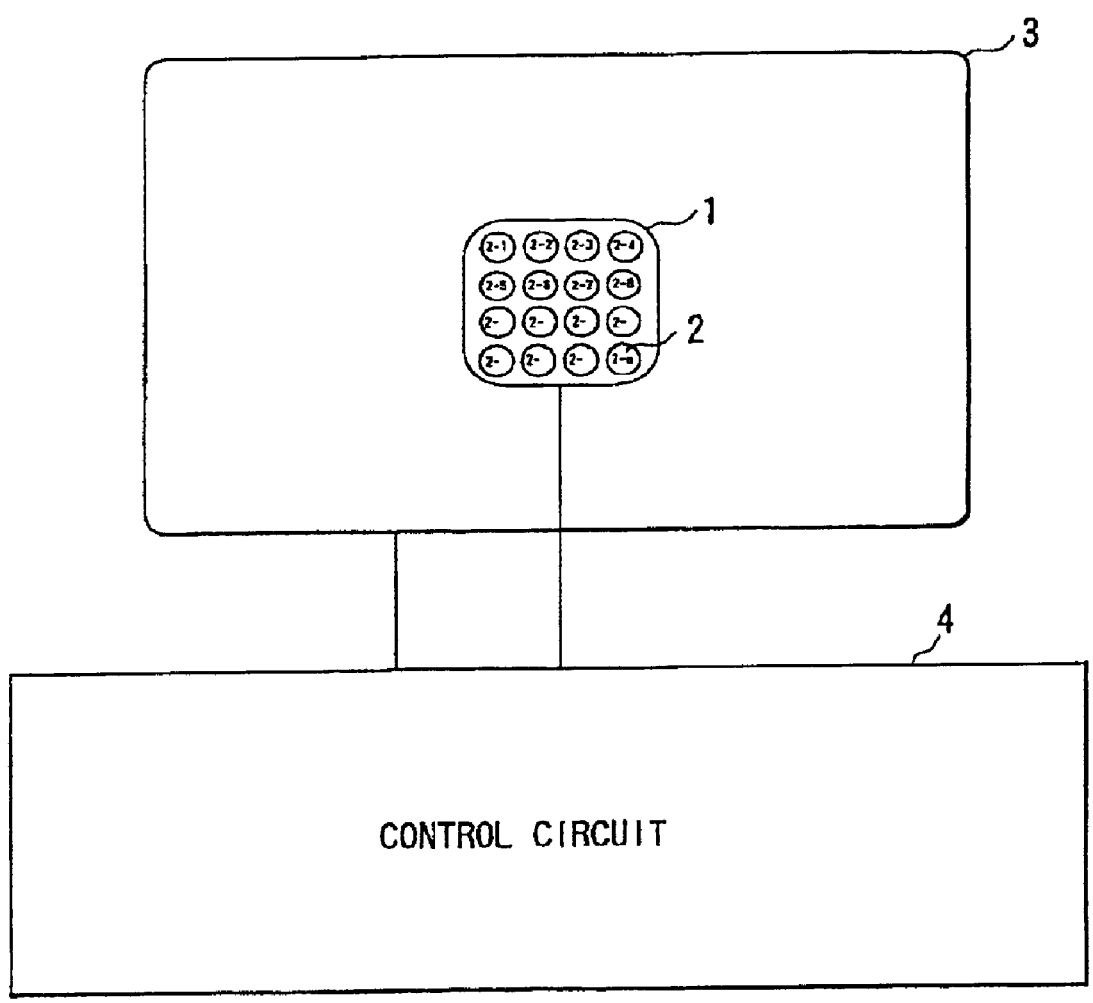
FIG. 1 is a block diagram illustrating the configuration of a photometric device according to a first embodiment of the present invention.

FIG. 1 illustrates the configuration of a photometric device according to a first embodiment of the present invention. It should be noted that description will be made herein assuming that the photometric device is provided for a camera (film camera, digital camera, video camera or the like).

In FIG. 1, reference numeral 1 refers to a first photometric sensor for performing photometry in a specific area (predetermined area: a central area of a picture in the first embodiment) of a picture. Reference numeral 2 refers to a second photometric sensor consisting of a group of small sensors (photoelectric conversion elements) 2-1, 2-2, . . . , 2-n for performing photometry in a plurality of subareas formed by dividing some or all of the specific area.

Reference numeral 3 refers to a third photometric sensor for performing photometry in a peripheral area around the specific area. Reference numeral 4 refers to a control circuit connected to the first photometric sensor 1, the second photometric sensor 2, and the third photometric sensor 3, for controlling each of the photometric sensors and receiving outputs therefrom to perform various types of arithmetical operations and determinations. The control circuit 4 may be responsible for various operations of the overall camera.

The operation of the photometric device configured as above will be described with reference to a flow chart in FIG. 2.

First, the control circuit 4 sends a control signal to the first photometric sensor 1 to cause it to perform photometry in the specific area, and then obtains a photometric value L1 thereof (S101).

Subsequently, the control circuit 4 sends a control signal to the group of sensors 2-1, 2-2, . . . , 2-n constituting the second photometric sensor 2 to cause them to perform photometry in the respective subareas, and then obtains photometric values L2-1 to L2-n thereof (S102).

The control circuit 4 sends a control signal to the third photometric sensor 3 to cause it to perform photometry in the peripheral area, and then obtains a photometric value L3 thereof (S103).

Next, the control circuit 4 makes calculations to determine whether variations (that is, variations in luminance in the specific area) exceed a certain degree in the photometric values L2-1 to L2-n from the second photometric sensor 2.

Specifically, the control circuit 4 first calculates a maximum value L2max of the photometric values L2-1 to L2-n of the sensor group (S104). The control circuit 4 calculates a minimum value L2min of the photometric values L2-1 to L2-n of the sensor group (S105) as well. The control circuit 4 also calculates an average value L2typ of the photometric values L2-1 to L2-n of the sensor group (S106).

When L2max−L2min is greater than a predetermined luminance difference (predetermined value) La, that is, when variations in luminance exist (S107), the photometric value L1 obtained by the first photometric sensor 1 is corrected in accordance with the luminance difference (S108).

A possible method of the correction is, for example:

(1) to correct the photometric value L1 to be smaller by the ratio of the average output value L2typ of the second photometric sensor 2 to the minimum output value L2min of the second photometric sensor 2 (L2min/L2type);

(2) to correct the photometric value L1 to be larger by the ratio of the average output value L2typ of the second photometric sensor 2 to the maximum output value L2max of the second photometric sensor 2 (L2max/L2typ);

(3) to correct the photometric value L1 to be smaller in accordance with a proportion of output values classified as the lowest luminance in a histogram formed by dividing the output values L2-1 to L2-n of the second photometric sensor 2 by a predetermined luminance; or (4) to correct the photometric value L1 to be larger in accordance with a proportion of output values classified as the highest luminance in a histogram formed by dividing the output values L2-1 to L2-n of the second photometric sensor 2 by a predetermined luminance.

On the other hand, when L2max−L2min is equal to or smaller than the predetermined luminance difference La, that is, when variations in luminance are small, the flow proceeds to step S109.

The control circuit 4 calculates a difference between the photometric value L3 from the third photometric sensor 3 and the photometric value L1 of the first photometric sensor 1 corrected at step S108 or the photometric value L1 at step S101 when variations in luminance are small. When the difference is greater than a determination reference luminance Lb (S109), the control circuit 4 determines that the scene for which a picture is to be taken is a backlighted scene (S110). Based on this backlight determination, the control circuit 4 or a camera control circuit, not shown, causes a strobe light to flash while taking pictures, for example.

In this manner, according to the first embodiment, accurate partial photometry and spot photometry can be performed with favorable linearity at a lower luminance through the first photometric sensor 1 for the specific area of wide area to a certain degree. In addition, since the result (L1) of the photometry in the specific area is corrected on the basis of the photometric results obtained in small spots of the subareas in the specific area from the second photometric sensor 2, a backlight situation can be more accurately determined or control of taking pictures can be achieved such as strobe light flashing suitable for taking pictures in a backlight situation. Moreover, the first embodiment can be realized with a simple configuration without requiring any special photometric sensor or photometric circuit different from one conventionally used.

It should be noted that the present invention is not limited to the details in the first embodiment. For example, while the aforementioned first embodiment has been described for the determination of variations in luminance in the specific area through the second photometric sensor 2 by calculating the maximum and minimum values in the luminance and determining that variations in luminance exist when the difference between the values is greater than the predetermined value La, similar effects can be achieved, for example, by determining that variations in luminance exist when adjacent ones of the sensors present a difference in luminance equal to or greater than a predetermined value.

To prevent noise and the like, it may be determined that variations in luminance exist when the number of sensors producing outputs in a predetermined high-luminance range and the number of sensors producing outputs in a predetermined low-luminance range are equal to or greater than respective predetermined numbers in the second photometric sensor (sensor group).

Furthermore, while the four methods have been described for correcting the photometric value L1 of the first photometric sensor L1 based on the outputs from the second photometric sensor 2 at step S109, the present invention is not limited thereto. Specifically, similar effects can be achieved by correcting the photometric value L1 so as to obtain actual subject luminance measured by the first photometric sensor or information on luminance (not necessarily subject luminance) for determining backlight.

(Second Embodiment)

Figure 3:
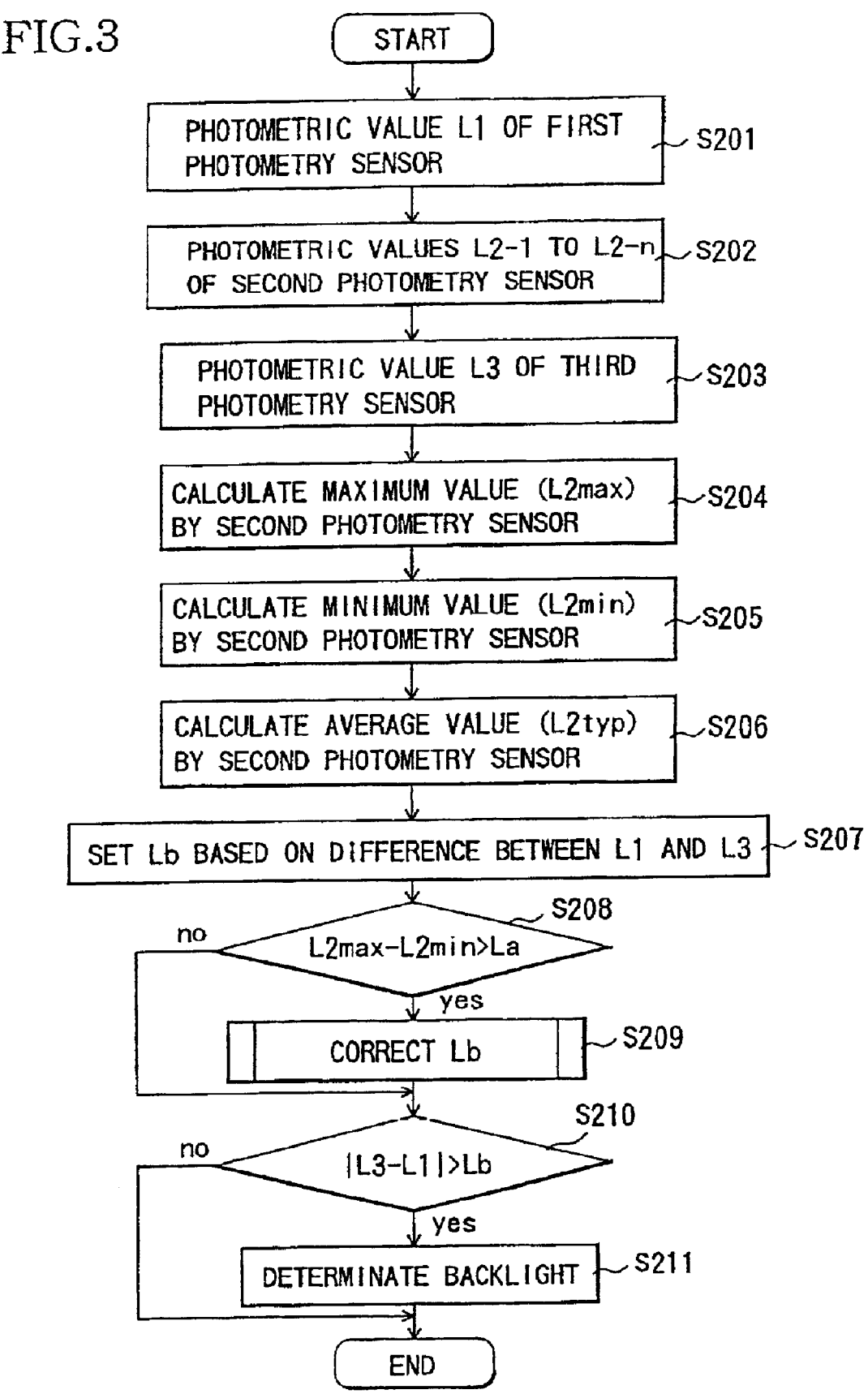
FIG. 3 is a flow chart illustrating the operation of a photometric device according to a second embodiment of the present invention.

FIG. 3 shows a flow chart illustrating the operation of a photometric device according to a second embodiment of the present invention. The configuration of the photometric device in the second embodiment is identical to that in the first embodiment.

First, a control circuit 4 sends a control signal to a first photometric sensor 1 to cause it to perform photometry in a specific area, and then obtains a photometric value L1 thereof (S201).

Subsequently, the control circuit 4 sends a control signal to a group of sensors 2-1, 2-2, . . . , 2-n constituting a second photometric sensor 2 to cause them to perform photometry in respective subareas, and then obtains photometric values L2-1 to L2-n thereof (S202).

The control circuit 4 sends a control signal to a third photometric sensor 3 to cause it to perform photometry in a peripheral area, and then obtains a photometric value L3 thereof (S203).

Next, the control circuit 4 makes calculations to determine whether variations (that is, variations in luminance in the specific area) exceed a certain degree in the photometric values L2-1 to L2-n from the second photometric sensor 2.

Specifically, the control circuit 4 first calculates a maximum value L2max of the photometric values L2-1 to L2-n of the sensor group (S204). The control circuit 4 calculates a minimum value L2min of the photometric values L2-1 to L2-n of the sensor group (S205) as well. The control circuit 4 also calculates an average value L2typ of the photometric values L2-1 to L2-n of the sensor group (S206).

In addition to these series of processing, the control circuit 4 sets a determination reference value Lb serving as a reference value for determining backlight based on the difference between the photometric value L1 from the first photometric sensor 1 and the photometric value L3 from the third photometric sensor 3 (S207). This is set with an empirical value (experimental value), for example in such a manner that backlight is determined normally when a difference of "1.0 EV or more" exists between a dark level in a central portion and a bright level in its peripheral area.

When L2max−L2min is greater than a predetermined luminance difference (predetermined value) La, that is, when variations in luminance exist (S208), the control circuit 4 corrects the determination reference value Lb in accordance with the luminance difference (S209).

Specifically, since the photometric value of the first photometric sensor 1 is an average in the overall specific area, the determination reference value Lb may be corrected to be smaller by the ratio of the average output value L2typ of the second photometric sensor 2 to the minimum output value L2min of the second photometric sensor 2 (L2min/L2type), or by the ratio of the average output value L2typ of the second photometric sensor 2 to the maximum output value L2max of the second photometric sensor 2 (L2max/L2typ). The correction method, however, is not limited thereto.

On the other hand, when L2max−L2min is equal to or smaller than the predetermined luminance difference La, that is, when variations in luminance are small, the flow proceeds to step S210.

The control circuit 4 calculates the difference between the photometric value L3 of the third photometric sensor 3 and the photometric value L1 of the first photometric sensor 1. When the difference is greater than the determination reference value Lb corrected at step S209 or the determination reference value Lb set at step S207 when variations in luminance are small (S210), the control circuit 4 determines that the scene for which a picture is to be taken is a backlighted scene (S211). Based on this backlight determination, the control circuit 4 or a camera control circuit, not shown, causes a strobe light to flash while taking pictures, for example.

In this manner, according to the second embodiment, accurate partial photometry and spot photometry can be performed with favorable linearity at a lower luminance through the first photometric sensor 1 for the specific area of wide area to a certain degree. In addition, since the reference value Lb for backlight determination is corrected on the basis of the photometric results in small spots of the subareas in the specific area from the second photometric sensor 2, a backlight situation can be more accurately determined or control of photography can be achieved such as strobe light flashing suitable for taking pictures in a backlight situation.

For example, when a subject is smaller than the specific area where partial photometry or spot photometry is performed or when a subject lies only in some of the specific area, the subject is presumed to have a brightness lower than that represented by the actual photometric output in the specific area. Thus, correcting the determination reference value Lb to be lower to facilitate backlight determination allows more accurate determination of a backlight situation.

In addition, the second embodiment can be realized with a simple configuration without requiring any special photometric sensor or photometric circuit different from one conventionally used.

The present invention is not limited to the details in the second embodiment. For example, while the aforementioned second embodiment has been described for the determination of variations in luminance in the specific area through the second photometric sensor 2 by calculating the maximum and minimum values in the luminance and determining that variations in luminance exist when the difference between the values is greater than the predetermined value La, similar effects can be achieved, for example, by determining that variations in luminance exist when adjacent ones of the sensors present a difference in luminance equal to or greater than a predetermined value.

To prevent noise and the like, it may be determined that variations in luminance exist when the number of sensors producing outputs in a predetermined high-luminance range and the number of sensors producing outputs in a predetermined low-luminance range are equal to or greater than respective predetermined numbers in the second photometric sensor (sensor group).

Furthermore, while the method for correcting the determination reference value Lb based on the outputs from the second photometric sensor 2 has been described at step S209, the present invention is not limited thereto. Specifically, the determination reference value Lb may be calculated with table data formed to achieve the aforementioned object or based on a so-called fuzzy theory.

Similar effects can be obtained by correcting the determination reference value Lb so as to obtain actual subject luminance measured by the first photometric sensor or information on luminance (not necessarily subject luminance) for determining backlight.

(Third Embodiment)

Figure 4:
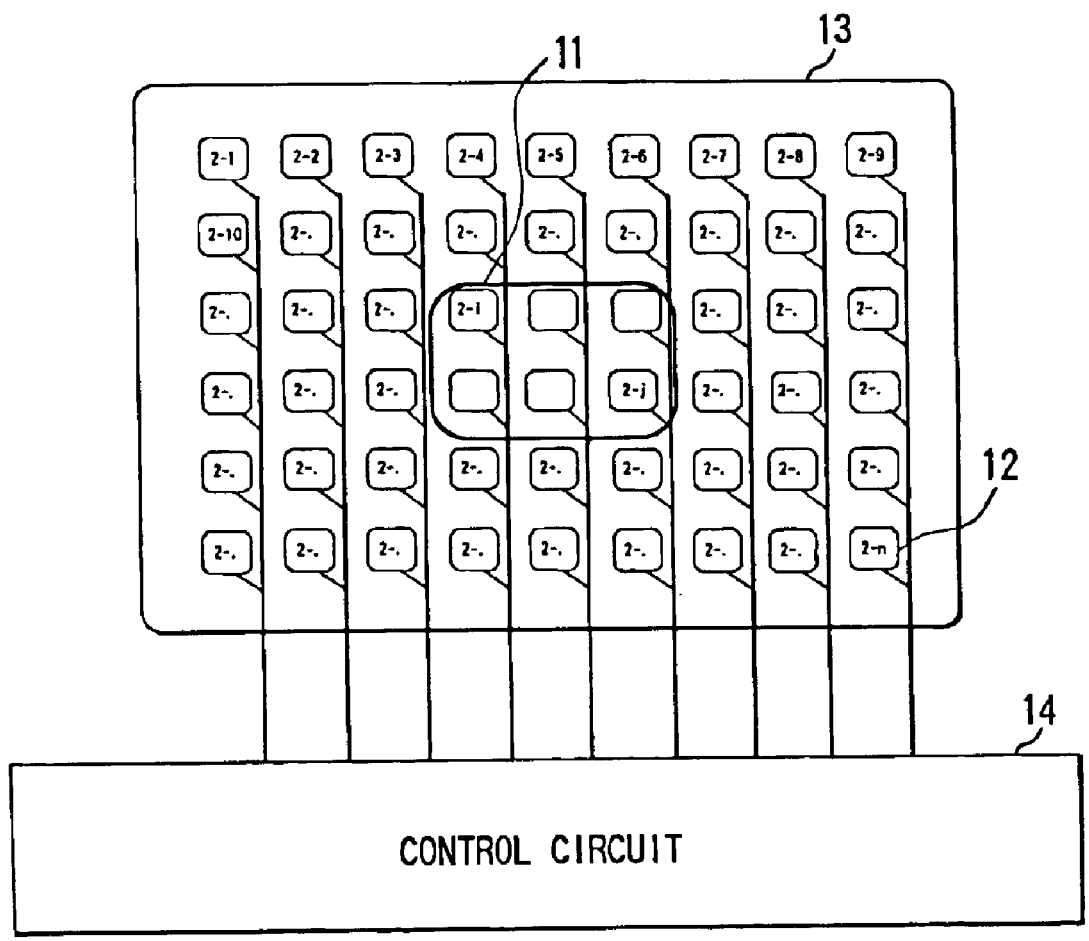
FIG. 4 is a block diagram illustrating the configuration of a photometric device according to a third embodiment of the present invention.

FIG. 4 illustrates the configuration of a photometric device according to a third embodiment of the present invention. It should be noted that description will be made herein assuming that the photometric device is provided for a camera.

In FIG. 4, reference numeral 12 refers to a group of photoelectric conversion elements (photometric sensors) arranged all over a photographic area, in which the individual photoelectric conversion elements are designated by reference numerals of 2-1 to 2-n.

Reference numeral 11 refers to photoelectric conversion elements 2-i to 2-j which are included in a specific area of the picture (predetermined area: an area surrounded by a black bold line in a central portion of the picture) and are called herein a first photometric sensor group. In the third embodiment, as later described, the sum of photocurrents from the photoelectric conversion elements 2-i, . . . , 2-j constituting the first photometric sensor group 11 is defined as a photometric value L1 in the specific area (in this case, the first photometric sensor group 11 corresponds to the first photometric sensor in the first embodiment), while individual photocurrent outputs from the photoelectric conversion elements 2-i, . . . , 2-j are defined as photometric values in subareas formed by dividing the specific area (in this case, each of the photoelectric conversion elements 2-i, . . . , 2-j corresponds to each sensor of the second photometric sensor group in the first embodiment).

Reference numeral 13 refers to a group of photoelectric conversion elements other than the first photoelectric conversion element group 11 (arranged in an area around the first photoelectric conversion element group 11) of all of the photoelectric conversion element group 12, called herein a third photometric sensor group.

Reference numeral 14 refers to a control circuit connected to all the photoelectric conversion elements 2-1 to 2-n for controlling the photoelectric conversion elements and receiving outputs therefrom to perform various types of arithmetic operations and determinations. The control circuit 14 may be responsible for various operations of the overall camera.

Figure 5:
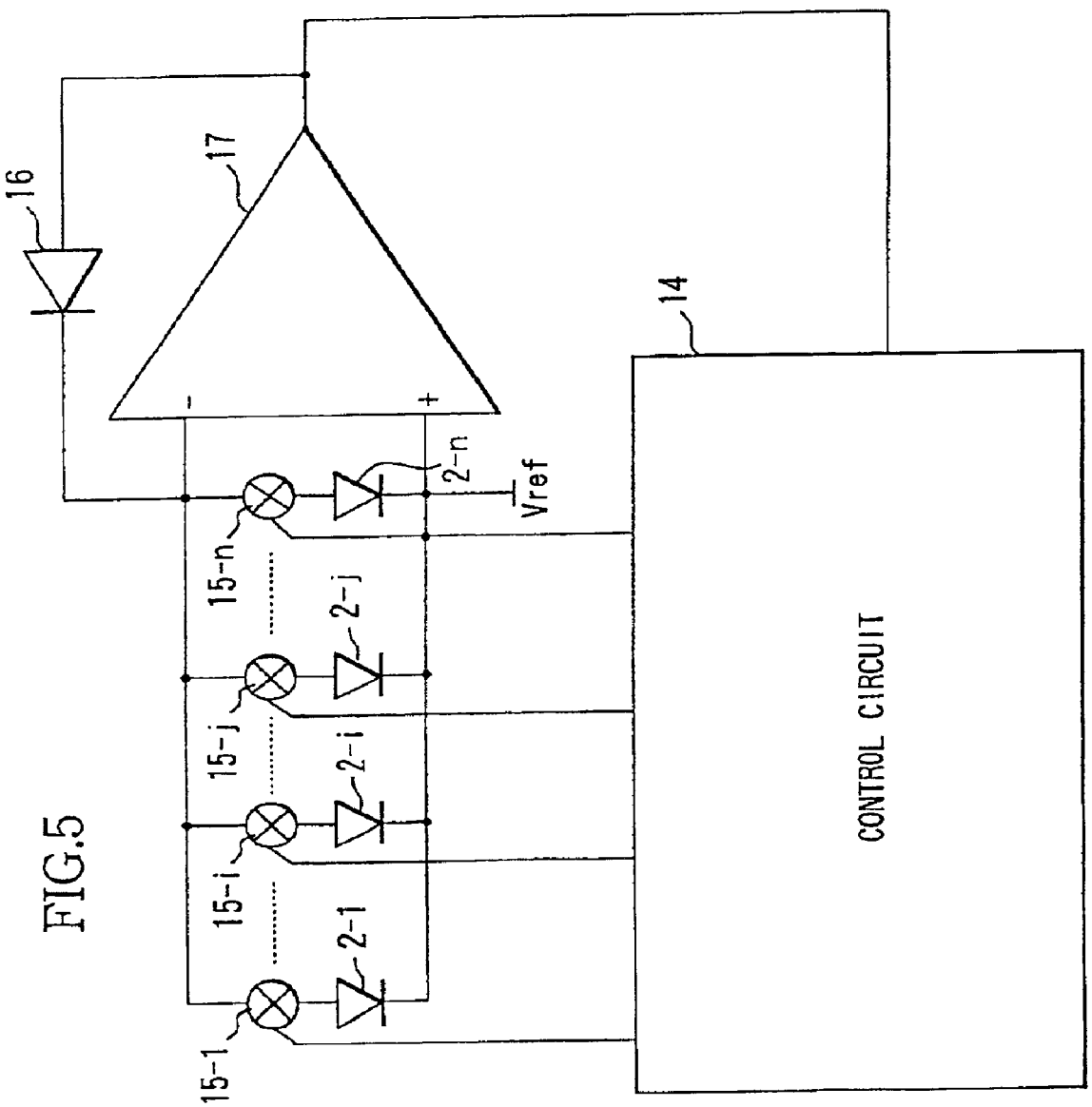
FIG. 5 is a circuit diagram illustrating a more detailed configuration of the photometric device according to the third embodiment.

FIG. 5 illustrates the configuration of the aforementioned photometric device more specifically. Each of the photoelectric conversion elements 2-1, . . . , 2-i. 2-j, . . . , 2-n comprises a photodiode, and the photoelectric conversion elements are connected to a positive input and a negative input of an amplifier 17 for compression through analog switches 15-1, . . . , 15-i, . . . , 15-j, . . . , 15-n, respectively. Turning on or off of the analog switches is controlled by the control circuit 14.

Reference numeral 16 refers to a diode for compression connected to an output of the amplifier 17 for compression and the negative input thereof.

The amplifier 17 for compression receives photocurrents from photoelectric conversion elements selected (their associated analog switches turned on) from all the photoelectric conversion elements, and outputs a signal of a value logarithmic with respect to luminance corresponding to the photocurrents, using the diode 16 for compression. The output signal is input to the control circuit 14 which performs various types of controls and arithmetic operations or determinations based on the output.

Figure 6:
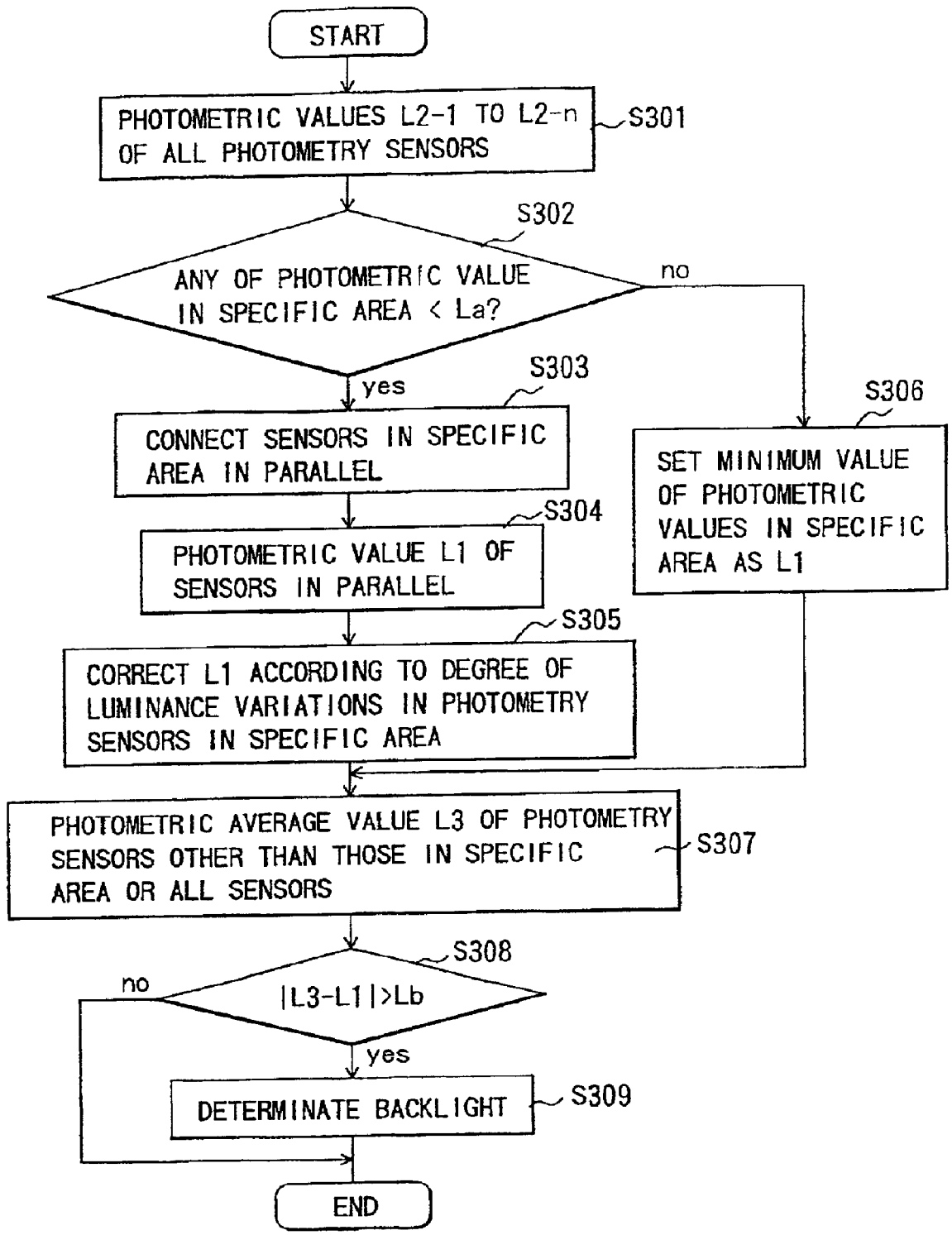
FIG. 6 is a flow chart illustrating the operation of the photometric device according to the third embodiment.

Next, the operation of the photometric device configured as above will be described with reference to a flow chart in FIG. 6. The control circuit 14 first obtains photometric data for each sensor of the photometric sensor group 12 (photoelectric conversion elements 2-1, . . . , 2-i, . . . , 2-j, . . . , 2-n) (S301).

Specifically, when photometric data of the photoelectric conversion element 2-1 is used, only the analog switch 15-1 is turned on and the other analog switches are turned off to pass a photocurrent only from the photoelectric conversion element 2-1 in accordance with the luminance to the diode 16 for compression, and a voltage drop produced at that point is transferred to the control circuit 14.

The control circuit 14 converts the voltage value from analog to digital signal. This operation is performed for all the photoelectric conversion elements 2-1 to 2-n.

Next, it is determined whether any of individual photometric values is lower than a predetermined luminance La in the first photometric sensor group 11 (photoelectric conversion elements 2-i to 2-j) in the specific area (S302). That is, it is determined whether any of the values indicates a lower luminance than the luminance La above which output linearity can be ensured in "output from photometric sensor for small area" in FIG. 10.

When at least one photometric sensor of the first photometric sensor group 11 produces an output lower (indicating a lower luminance) than the predetermined luminance La, output linearity of the sensor cannot be ensured, and thus the averaging of the outputs from the first photometric sensor group causes an error in the resultant photometric value. To prevent this, all the analog switches 15-i to 15-j are turned on to connect in parallel the photoelectric conversion elements 2-i to 2-j constituting the first photometric sensor group 11 (S303), the sum of photocurrents from the photoelectric conversion elements 2-i to 2-j is passed to the diode 16 for compression, and a voltage drop produced at that point is transferred to the control circuit 14.

The control circuit 14 converts the voltage value from analog to digital signal which is used as the photometric value L1 for the overall first photometric sensor group 11 or in the specific area (S304).

Figure 2:
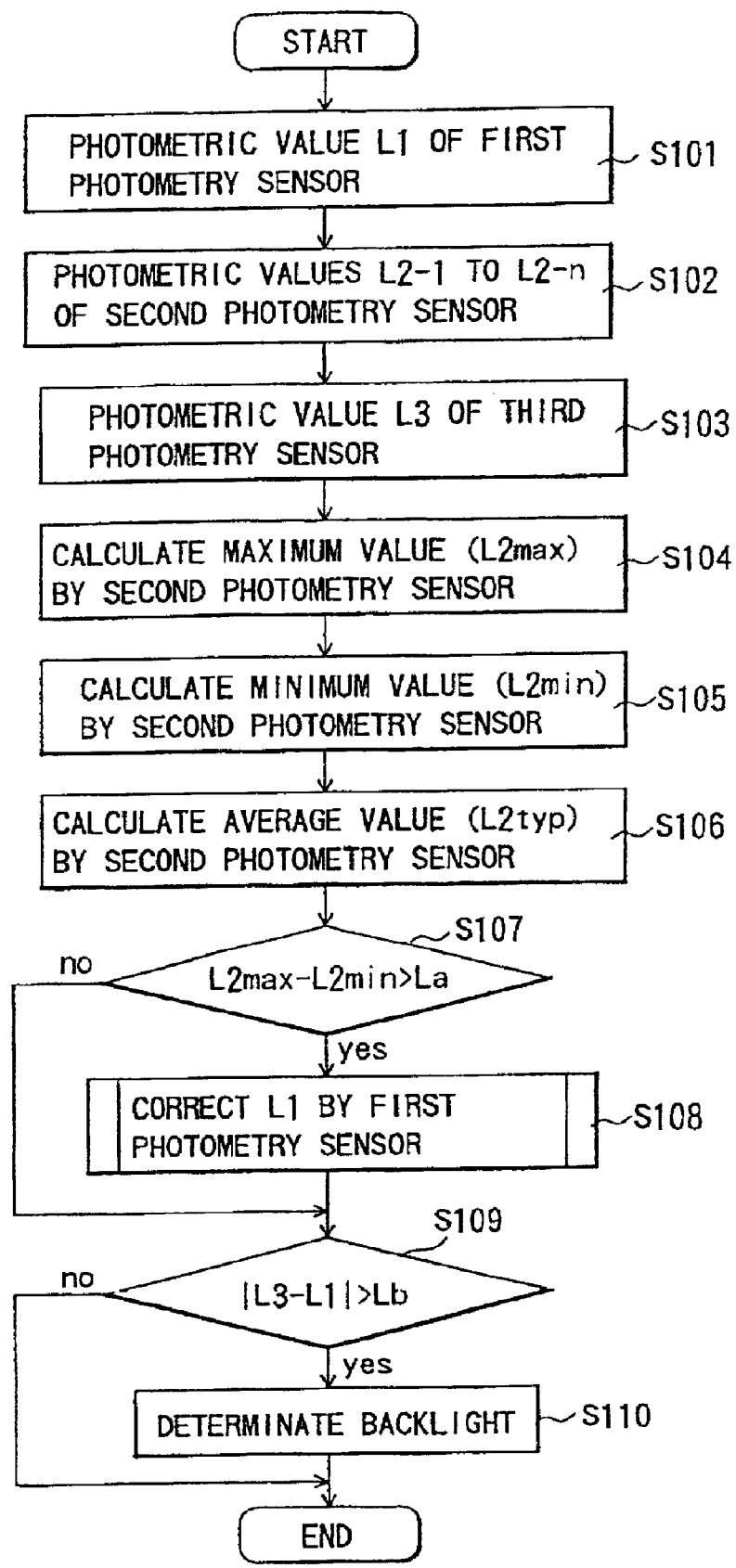
FIG. 2 is a flow chart illustrating the operation of the photometric device according to the first embodiment.

Then, at step S305, similarly to steps S107 and S108 in the flow chart of FIG. 2, the control circuit 14 determines whether variations in luminance exceed a certain degree in the specific area based on the outputs from the photoelectric conversion elements 2-i to 2-j in the specific area, and when variations in luminance exceed a certain degree, the control circuit 14 corrects the photometric value L1 obtained at step S304 in accordance with the degree and newly sets the corrected photometric value as the photometric value L1.

When all the outputs from the photoelectric conversion elements 2-i to 2-j constituting the first photometric sensor group 11 are greater than the predetermined luminance La, output linearity of the photometric sensors can be sufficiently ensured even with sensors of a small size, so that the lowest photometric value (indicating the lowest luminance) of the outputs from the photoelectric conversion elements 2-i to 2-j is acquired as the photometric value L1 in the specific area (S306).

Subsequently, the control circuit 14 turns on the analog switches 15-1 to 15-(i−1), 15-(j+1) to 15-n to allow detection of photocurrents from the photoelectric conversion elements other than those in the specific area (that is, the third photometric sensor group 2-1 to 2-(i−1), 2-(j+1) to 2-n). The sum of the photocurrents from the third photometric sensor group is passed to the diode 16 for compression, and a voltage drop produced at that point is transferred to the control circuit 14. The control circuit 14 converts the voltage value from analog to digital signal which is set as a photometric value L3 from the third photometric sensor group (S307).

Then, the control circuit 14 determines the difference between the photometric value L1 of the first photometric sensor group 11 calculated at step S305 or step S306 and the photometric value L3 of the third photometric sensor group 13 calculated at step S307, and when the difference is greater than a reference value Lb for backlight determining (S308), determines that the scene from which a picture is to be taken is a backlighted scene (S309). Based on this backlight determination, the control circuit 14 or a camera control circuit, not shown, causes a strobe light to flash while taking pictures, for example.

In this manner, according to the third embodiment, small photometric sensors (photoelectric conversion elements) are arranged all over the photographic area, and when at least one sensor of the first photometric sensor group 11 in the specific area produces an output lower than the predetermined luminance La, the sum of the photocurrents from the first photometric sensor group 11 is used as the photometric value L1 in the specific area, which is equivalent to photometry over a relatively large area. It is thus possible to perform partial photometry or spot photometry with favorable linearity at a lower luminance.

In addition, when it is determined that variations in luminance exceed a certain degree in the specific area based on the individual outputs from the first photometric sensor group 11 (photoelectric conversion elements 2-i to 2-j), the photometric value L1 is corrected similarly to the first embodiment based on the outputs from the individual photoelectric conversion elements, thereby making it possible to more accurately determine a backlight situation of a subject.

On the other hand, when all the outputs from the photoelectric conversion elements 2-i to 2-j constituting the first photometric sensor group 11 are greater than the predetermined luminance La and fall within a linearity range, the minimum value of the photometric values of the photoelectric conversion elements is used as the photometric value L1 in the specific area. This allows accurate backlight determination for a subject smaller than the specific area or a subject occupying only some of the specific area.

Furthermore, the third embodiment can be realized with a simple configuration without requiring any special photometric sensor or photometric circuit different from one conventionally used.

While the third embodiment has been described for the photoelectric conversion elements comprising photodiodes arranged all over the photographic area, an imaging device such as a CCD for use in a video camera or digital camera may be used instead. In this case, individual pixels or a group of pixels of such an imaging device are used as the photoelectric conversion elements in the aforementioned embodiment.

In addition, while the third embodiment has been described for the setting of the reference value Lb for backlight determination from the difference between the photometric value L1 in the specific area and the photometric value L3 in the peripheral area, the determination reference value may be set from a difference between a photometric value in the specific area and a photometric value in the overall picture-taking area including the specific area (the sum of photocurrents of all the photoelectric conversion elements).

(Fourth Embodiment)

Figure 7:
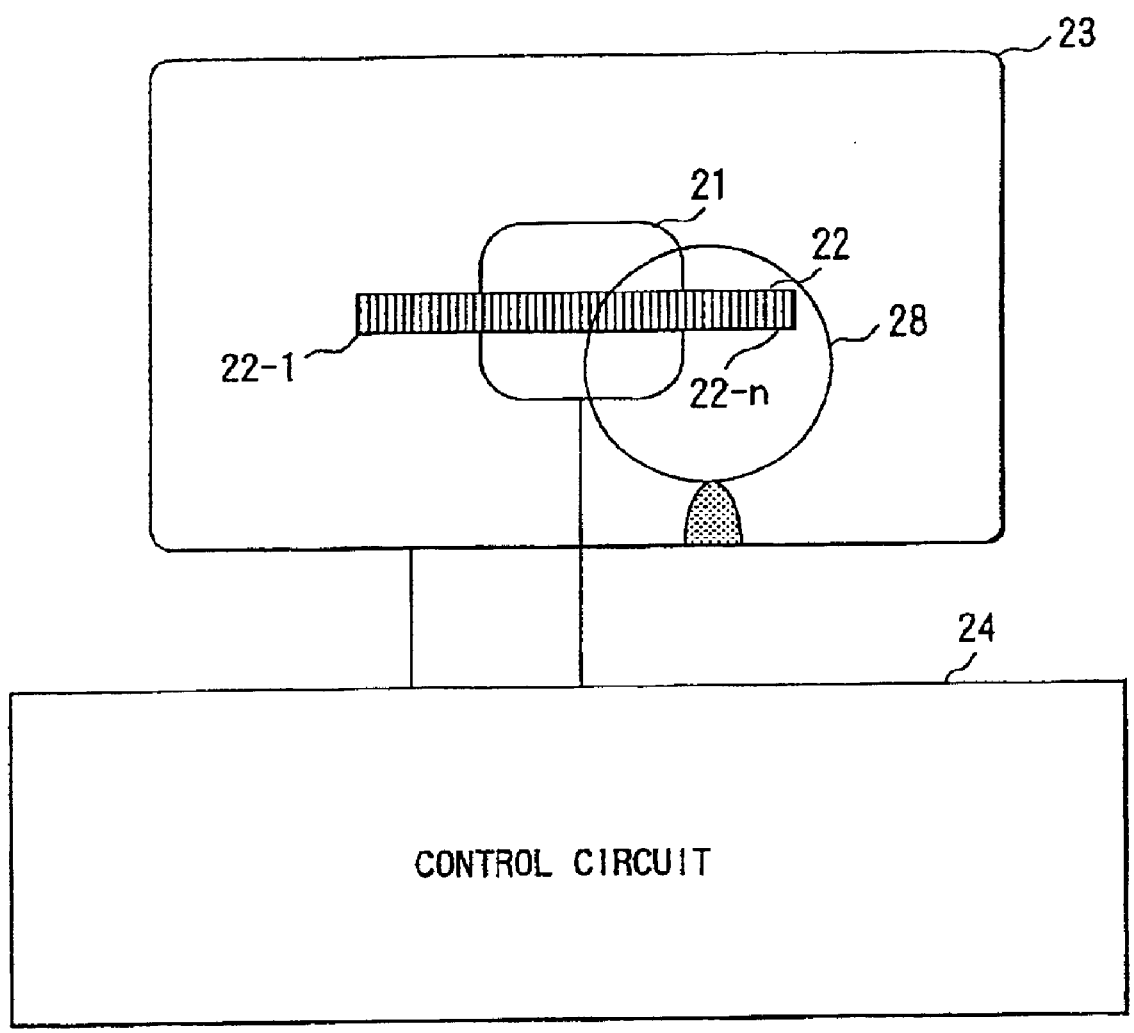
FIG. 7 is a block diagram illustrating the configuration of a photometric device according to a fourth embodiment of the present invention.

FIG. 7 illustrates the configuration of a photometric device according to a fourth embodiment of the present invention. Description will be made herein assuming that the photometric device is provided for a camera.

In FIG. 7, reference numeral 21 refers to a first photometric sensor for performing photometry in a specific area (predetermined area: a central area of a picture in the fourth embodiment).

Reference numeral 22 refers to a second photometric sensor consisting of a group of small sensors 22-1, 22-2, . . . , 22-n arranged corresponding to subareas formed by dividing some or all of the specific area. The sensors 22-1, 22-2, . . . , 22-n in the group also have a function as a multipoint distance measuring sensor in which each measures a distance in a subarea or a plurality of subareas corresponding thereto. As the sensor, a skim CCD (which comprises a plurality of charge transfer channels connected in loop form to configure a circular shift register and operates to circulate photoelectric-converted signal charge according to charge transfer pulses while adding the signal charge) or a CCD sensor used for passive AF or the like may be used, or a CMOS sensor may be used.

Instead of such a multipoint distance measuring sensor, a single distance measuring sensor may be used for measuring a distance in the overall specific area.

Reference numeral 23 refers to a third photometric sensor for performing photometry in a peripheral area around the photometric sensor 21. Reference numeral 24 refers to a control circuit connected to the first photometric sensor 21, the second photometric and distance measuring sensor 22, and the third photometric sensor 23, for controlling each of the photometric sensors and receiving outputs therefrom to perform various types of arithmetic operations and determinations. The control circuit 24 may be responsible for various operations of the overall camera. Reference numeral 28 represents a subject.

The operation of the photometric device configured as above will be described with reference to a flow chart in FIG. 8. The control circuit 24 first sends a control signal to the first photometric sensor 21 to cause It to perform photometry in the specific area, and then obtains a photometric value L1 thereof (S401).

Subsequently, the control circuit 24 sends a control signal to the group of sensors 22-1, 22-2, ..., 22-n constituting the second photometric sensor 22 to cause them to perform photometry in the respective subareas, and then obtains photometric values L2-1 to L2-n thereof (S402).

The control circuit 24 sends a control signal to the third photometric sensor 23 to cause it to perform photometry in the peripheral area, and then obtains a photometric value L3 thereof (S403).

The control circuit 24 sends a control signal to the group of sensors 22-1, 22-2, ..., 22-n constituting the second photometric sensor 22 to cause them to measure distances in the respective subareas, and then obtains information on the measured distances (S404).

Next, the control circuit 24 determines, from the obtained information on the measured distances, the area occupied by the subject 28 in the specific area, that is, the subareas including the subject 28, and then calculates the proportion of the area occupied by the subject 28 in the specific area (S405).

A possible calculating method in this case is to determine the area where it is presumed that the subject is most likely to exist from the information on the measured distances in the subareas (for example, when some of the subareas have measured distance information indicating a short distance and the others have measured distance information indicating a long distance, it is presumed that the subareas having measured distance information indicating a short distance are the subareas where the subject exists) before the calculation of the proportion of the subareas in the specific area.

When a distance is measured in one area and it is determined that measured distance information includes two conflicting types of information indicating a far side and a near side, respectively, the proportion of a subject in the specific area is calculated from a table according to the far/near conflict information.

For example, when the whole sensor 22 as a line sensor outputs one measured distance information, both a near subject and a far subject may be sensed by on the line sensor since the area to be measured is large. In this case, reliability is reduced in examining a correlation. When active distance measurement is performed, distance data or the like for the intensity of reflected light may present inconsistencies. Thus, the proportion of the subject in the area is roughly calculated with the far/near conflict information.

Then, the second photometric sensor 22 performs photometry in the subareas including the subject 28, and the average of the resultant photometric values is set as L2 (S406).

Next, the photometric value L1 in the specific area from the first photometric sensor 21 is corrected on the basis of the average photometric value L2, and the corrected photometric value is newly set as L1 (S407).

Specifically, since the subject occupies a portion from the center to the right of the first photometric area, luminance in the photometric sensor 21 is corrected with absolute values or relative values of the luminance in that portion and the luminance of the remaining area obtained by the line sensor 22. For example, when the photometric sensor 21 provides EV11 and the line sensor provides EV12 and EV8, the photometric sensor 21 is corrected to provide EV8 or EV9.

Next, the difference is calculated between the photometric value L1 calculated at step S407 and the photometric value L3 from the third photometric sensor 23, and when the difference is greater than a predetermined value Lb (S408), it is determined that the scene from which a picture is to be taken is a backlighted scene (S409). Based on this backlight determination, the control circuit 24 or a camera control circuit, not shown, causes a strobe light to flash while taking pictures, for example.

In this manner, according to the fourth embodiment, accurate partial photometry and spot photometry can be performed with favorable linearity at a lower luminance through the first photometric sensor 21 for the specific area of wide area to a certain degree.

In addition, since the photometric result (L1) in the specific area is corrected on the basis of the photometric result in the small spot of the subareas including the subject (object) 28 existing in some of the specific area from the second photometric sensor 22, a backlight situation of a subject can be more accurately determined or control of photography can be achieved such as strobe light flashing suitable for taking pictures in a backlight situation regardless of the position of a subject in the specific area or the proportion of the subject occupation.

Moreover, the fourth embodiment can be realized with a simple configuration without requiring any special photometric sensor or photometric circuit different from one conventionally used.

While the fourth embodiment has been described for the use of the line sensor 22 as the photometric and distance measuring sensor (which obtains subject distance information from the correlation between two sensors of the line sensor and is also used for photometry due to the ability to detect the level of light), a CCD or the like may be used as a distance measuring sensor to obtain measured distance information by examining a correlation, or another technique may be used to obtain measured distance information. Alternatively, a CCD or the like may be used as the second photometric sensor and as a distance measuring sensor, or a photometric sensor for performing photometry in substantially the same areas and a distance measuring sensor may be provided separately.

To prevent noise and the like, it may be determined that variations in luminance exist when the number of sensors producing outputs in a predetermined high-luminance range and the number of sensors producing outputs in a predetermined low-luminance range are equal to or greater than respective predetermined numbers in the second photometric sensor (sensor group).

While the fourth embodiment performs the determination of the area occupied by the subject in the specific area at step S405 by the calculation based on the degree of the far/near conflict and the probability of the subject in the plurality of distance measurement areas, the present invention is not limited thereto. For example, it is possible that, when a luminance difference greater than a predetermined value is found between adjacent subareas in photometric information in the distance measuring sensor, the edge between them is detected and a portion extending from the edge and having a lower luminance than the average is defined as an area where the subject exists, or another approach may be used to calculate an area where a subject exists in a specific photometric means.

(Fifth Embodiment)

FIG. 9 shows a flow chart illustrating the operation of a photometric device according to a fifth embodiment of the present invention. The configuration of the photometric device in the fifth embodiment is identical to that of the fourth embodiment.

A control circuit 24 sends a control signal to a first photometric sensor 21 to cause it to perform photometry in a specific area, and then obtains a photometric value L1 thereof (S501).

Subsequently, the control circuit 24 sends a control signal to a group of sensors 22-1, 22-2, . . . , 22-n constituting a second photometric sensor 22 to cause them to perform photometry in respective subareas, and then obtains photometric values L2-1 to L2-n thereof (S502).

The control circuit 24 sends a control signal to a third photometric sensor 23 to cause it to perform photometry in a peripheral area, and then obtains a photometric value L3 thereof (S503).

The control circuit 24 sends a control signal to the group of sensors 22-1, 22-2, . . . , 22-n constituting the second photometric sensor 22 to cause them to measure distances in the respective subareas, and then obtains information on the measured distances (S504).

Next, the control circuit 24 determines, from the obtained information on the measured distances, the area occupied by the subject 28 in the specific area, that is, the subareas including the subject 28, and then calculates the proportion of the area occupied by the subject 28 in the specific area (S505).

A possible calculating method in this case is to determine the area where it is presumed that the subject is most likely to exist from the information on the measured distances in the subareas (for example, when some of the subareas have measured distance information indicating a short distance and the others have measured distance information indicating a long distance, it is presumed that the subareas having measured distance information indicating a short distance are the subareas where the subject exists) before the calculation of the proportion of the subareas in the specific area.

When a distance is measured in one area and it is determined that measured distance information includes two conflicting types of information indicating a far side and a near side, respectively, the proportion of a subject in the specific area is calculated from a table according to the far/near conflict information.

Then, the second photometric sensor 22 performs photometry in the subareas including the subject 28, and the average of the resultant photometric values is set as L2 (S506).

In addition, a determination reference value Lb is set for backlight determination from the difference between the photometric value L1 of the first photometric sensor 21 in the specific area and the photometric value L3 of the third photometric sensor 23 (S507).

The determination reference value Lb is corrected on the basis of the aforementioned average photometric value L2 (S508). This is basically the same as S209 in FIG. 3. At S507, a standard Lb (which means a conventional 1Ev) is set.

Next, the difference is calculated between the photometric value L1 of the first photometric sensor 21 and the photometric value L3 of the third photometric sensor 23, and when the difference is greater than the determination reference value Lb corrected at step S508 (S509), the scene from which a picture is to be taken is determined as a backlighted scene (S510). Based on this backlight determination, the control circuit 24 or a camera control circuit, not shown, causes a strobe light to flash while taking pictures, for example.

In this manner, according to the fifth embodiment, accurate partial photometry and spot photometry can be performed with favorable linearity at a lower luminance through the first photometric sensor 21 for the specific area of wide area to a certain degree.

In addition, since the reference value Lb for backlight determination is corrected on the basis of the photometric result in the small spot of the subareas including the subject (object) 28 existing in some of the specific area from the second photometric sensor 22, a backlight situation of a subject can be more accurately determined or control of photography can be achieved such as strobe light flashing suitable for taking pictures in a backlight situation regardless of the position of a subject in the specific area or the proportion of the subject occupation.

Moreover, the fifth embodiment can be realized with a simple configuration without requiring any special photometric sensor or photometric circuit different from one conventionally used.

In the fifth embodiment, measured distance information may be obtained by using a CCD and the like as a distance measuring sensor and examining a correlation, or by means of another technique. Alternatively, a CCD or the like may be used as the second photometric sensor and as a distance measuring sensor, or a photometric sensor for performing photometry in substantially the same areas and a distance measuring sensor may be provided separately.

To prevent noise and the like, it may be determined that variations in luminance exist when the number of sensors producing outputs in a predetermined high-luminance range and the number of sensors producing outputs in a predetermined low-luminance range are equal to or greater than respective predetermined numbers in the second photometric sensor (sensor group).

While the fifth embodiment performs the determination of the area occupied by the subject in the specific area at step S505 by the calculation based on the degree of the far/near conflict and the probability of the subject in the plurality of distance measuring areas, the present invention is not limited thereto. For example, it is possible that, when a luminance difference greater than a predetermined value is found between adjacent subareas in photometric information in the distance measuring sensor, the edge between them is detected and a portion extending from the edge and having a lower luminance than the average is defined as an area where the subject exists, or another approach may be used to calculate an area where a subject exists in a specific photometric means.

In addition, the photometric device in the aforementioned first, second, fourth, or fifth embodiment may employ a sensor comprising a group of photoelectric conversion elements arranged all over the taking-picture area, as described in the third embodiment. As the sensor, an imaging device may be used, such as a CCD including a pixel or a group of pixels serving as photoelectric conversion elements, or a CMOS sensor.

What is claimed is:

1. A photometric device comprising:
a first area including a plurality of photoelectric transfer elements for performing photometry in the first area;

a plurality of second areas, each included in the first area and sharing a photoelectric element with the first area, for performing photometry in the plurality of second areas; and determination means for correcting a photometric result in the first area when a difference greater than a predetermined value exists among photometric results in the plurality of second areas, and determining whether a backlight state exists based on the corrected photometric result in the first area.

2. The photometric device according to claim 1, wherein said determination means corrects the photometric result in the first area on the basis of a ratio of an average value of the photometric results in the plurality of second areas to a value indicating the highest luminance or lowest luminance of the photometric results in the plurality of second areas.

3. The photometric device according to claim 1, wherein said determination means corrects the photometric result in the first area on the basis of a proportion of photometric results falling within a predetermined high-luminance range or low-luminance range of the photometric results in the plurality of second areas.

4. The photometric device according to any of claims 1 to 3, wherein the photometric device comprises an overall area including the first area and a peripheral area around the first area, and said determination means determines a backlight state exists when a difference greater than a predetermined reference value exists between the photometric result in the first area and a photometric result in the peripheral area around the first area.

5. The photometric device according to any of claims 1 to 3, the photometric device comprising a plurality of photoelectric conversion means arranged on an overall area of the photometric device where photometry can be performed, wherein a sum of outputs from photoelectric conversion means included in the first area or a value corresponding to an output indicating the lowest luminance of the outputs from the photoelectric conversion means included in the first area is used as the photometric result in the first area, and values corresponding to the outputs from the respective photoelectric conversion means included in the first area are used as the photometric results in the plurality of second areas.

6. The photometric device according to any of claims 1 to 3, the photometric device comprising a plurality of photoelectric conversion means arranged on an overall area of the photometric device where photometry can be performed, wherein a sum of outputs from photoelectric conversion means included in the first area or a value corresponding to an output indicating the lowest luminance of the outputs from the photoelectric conversion means included in the first area is used as the photometric result in the first area, and a value corresponding to a sum of outputs from photoelectric conversion means other than the photoelectric conversion means included in the first area is used as a photometric result in a peripheral area.

7. The photometric device according to any of claims 1 to 3, the photometric device comprising an overall area including the first area and a peripheral area around the first area, and wherein said determination means determines a backlight state exists when a difference greater than a predetermined reference value exists between the photometric result in the first area and a photometric result in the overall area.

8. The photometric device according to claim 7, comprising a plurality of photoelectric conversion means arranged on the overall area where photometry can be performed, wherein a sum of outputs from photoelectric conversion means included in the first area or a value corresponding to an output indicating the lowest luminance of the outputs from the photoelectric conversion means included in the first area is used as the photometric result in the first area, and a value corresponding to a sum of outputs from the photoelectric conversion means in the overall area is used as a photometric result in the overall area.

9. The photometric device according to claim 4, wherein a value corresponding to a sum of outputs from photoelectric conversion means included in the first area is used as the photometric result in the first area when at least one of the outputs from the photoelectric conversion means is less than a predetermined value, and a value corresponding to an output indicating the lowest luminance of the outputs from the photoelectric conversion means included in the first area is used as the photometric result in the first area when all the outputs from the photoelectric conversion means are greater than the predetermined value.

10. A photometric device including an overall area where photometry can be performed, the overall area including a first area having a plurality of photoelectric transfer elements for performing photometry in the first area, a plurality of second areas, each included in the first area and sharing a photoelectric transfer element with the first area, for performing photometry in the second areas, and a peripheral area around the first area, said photometric device comprising:

means for setting a reference value for determining whether a backlight state exists based on a difference between a photometric result in the first area and a photometric result in the peripheral area or a photometric result in the overall area; and means for correcting the reference value based on the photometric results in the plurality of second areas when a difference greater than a predetermined value exists among photometric results in the second areas.

11. The photometric device according to claim 10, wherein the correcting means corrects the reference value on the basis of a ratio of an average value of the photometric results in the plurality of second areas to a value indicating the highest luminance or lowest luminance of the photometric results in the plurality of second areas.

12. The photometric device according to claim 10, wherein the correcting means corrects the reference value on the basis of a proportion of photometric results falling within a predetermined high-luminance range or low-luminance range of the photometric results in the plurality of second areas.

13. The photometric device according to any of claims 10 to 12, wherein said determination means determines a backlight state exists when a difference greater than a predetermined reference value exists between the photometric result in the first area and the photometric result in the peripheral area.

14. The photometric device according to any of claims 10 to 12, comprising a plurality of photoelectric conversion means arranged on the overall area where photometry can be performed, wherein a sum of outputs from photoelectric conversion means included in the first area of said plurality of photoelectric conversion means or a value corresponding to an output indicating the lowest luminance of the outputs from the photoelectric conversion means included in the first area is used as the photometric result in the first area, wherein values corresponding to the outputs from the respective photoelectric conversion means included in the first area are used as the photometric results in the plurality of second areas, and wherein a value corresponding to a sum of outputs from specific photoelectric conversion means other than the photoelectric conversion means included in the first area is used as the photometric result in the peripheral area.

15. The photometric device according to any of claims 10 to 12, wherein said determination means determines a backlight state exists when a difference greater than a predetermined reference value exists between the photometric result in the first area and the photometric result in the overall area.

16. The photometric device according to claim 15, comprising a plurality of photoelectric conversion means arranged on the overall area where photometry can be performed, wherein a sum of outputs from photoelectric conversion means included in the first area or a value corresponding to an output indicating the lowest luminance of the outputs from the photoelectric conversion means included in the first area is used as the photometric result in the first area, wherein values corresponding to the outputs from the respective photoelectric conversion means included in the first area are used as the photometric results in the plurality of second areas, and wherein a value corresponding to a sum of outputs from the photoelectric conversion means in the overall area is used as the photometric result in the overall area.

17. The photometric device according to claim 14, wherein a value corresponding to a sum of outputs from photoelectric conversion means included in the first area is used as the photometric result in the first area when at least one of the outputs from the photoelectric conversion means is less than a predetermined value, and a value corresponding to an output indicating the lowest luminance of the outputs from the photoelectric conversion means included in the first area is used as the photometric result in the first area when all the outputs from the photoelectric conversion means are greater than the predetermined value.

18. A photometric device comprising:

a first area including a plurality of photoelectric transfer elements for performing photometry in the first area means for determining a plurality of second areas including an object for which backlight is to be determined on the basis of information on measured distance in at least a part of the first area, each second area being included in the first area and sharing a photoelectric transfer element with the first area; and determining means for correcting the photometric result in the first area based on photometric results in the plurality of second areas including the object, and determining whether the object is in a backlight state based on the corrected photometric result.

19. The photometric device according to claim 18, wherein photometry and distance measurement are performed in each of the plurality of second areas.

20. The photometric device according to claim 18 or 19, wherein a detection element for performing distance measurement also performs photometry.

21. The photometric device according to any of claims 18 and 19, wherein the photometric result in the first area is corrected on the basis of a proportion of the plurality of second areas including the object.

22. The photometric device according to any of claims 18 and 19, comprising a plurality of photoelectric conversion means arranged on an overall area where photometry can be performed, wherein a sum of outputs from photoelectric conversion means included in the first area or a value corresponding to an output indicating the lowest luminance of the outputs from the photoelectric conversion means included in the first area is used as the photometric result in the first area, and wherein values corresponding to the outputs from respective photoelectric conversion means included in the first area are used as photometric results in the plurality of second areas.

23. The photometric device according to any of claims 18 and 19, comprising an overall area on which photometry can be performed, the overall area including the first area and a peripheral area around the first area, wherein said determination means determines a backlight state exists when a difference greater than a predetermined reference value exists between the photometric result in the first area and a photometric result in the peripheral area around the first area.

24. The photometric device according to 23, comprising a plurality of photoelectric conversion means arranged on the overall area where photometry can be performed, wherein a sum of outputs from photoelectric conversion means included in the first area or a value corresponding to an output indicating the lowest luminance of the outputs from the photoelectric conversion means included in the first area is used as the photometric result in the first area, and wherein a value corresponding to a sum of outputs from photoelectric conversion means other than the photoelectric conversion means included in the first area is used as the photometric result in the peripheral area.

25. The photometric device according to any of claims 18 and 19, comprising an overall area in which photometry can be performed, the overall area including the first area, wherein said determination means determines a backlight state exists when a difference greater than a predetermined reference value exists between the photometric result in the first area and a photometric result in the overall area.

26. The photometric device according to claim 25, comprising a plurality of photoelectric conversion means arranged on the overall area, wherein a sum of outputs from photoelectric conversion means included in the first area or a value corresponding to an output indicating the lowest luminance of the outputs from the photoelectric conversion means included in the first area is used as the photometric result in the first area, and wherein a value corresponding to a sum of outputs from the photoelectric conversion means in the overall area is used as the photometric result in the overall area.

27. The photometric device according to claim 22, wherein a value corresponding to a sum of outputs from photoelectric conversion means included in the first area is used as the photometric result in the first area when at least one of the outputs from the photoelectric conversion means is less than a predetermined value, and a value corresponding to an output indicating the lowest luminance of the outputs from the photoelectric conversion means included in the first area is used as the photometric result in the first area when all the outputs from the photoelectric conversion means are greater than the predetermined value.

28. A photometric device including an overall area where photometry can be performed, the overall area having a first area having a plurality of photoelectric transfer elements for performing photometry in the first area, and a plurality of second areas around a periphery of the first area, each being included in the first area and sharing a photoelectric transfer element with the first area, said photometry device comprising:

means for setting a reference value for determining whether a backlight state exists based on a difference between a photometric result in the first area and photometric results in the plurality of second areas or a photometric result in the overall area;

means for determining any of the plurality of second areas including an object for which a backlight state is to be determined on the basis of information on measured distance in at least a part of the first area; and means for correcting the reference value based on a photometric result in the second areas including the object.

29. The photometric device according to claim 28, wherein photometry and distance measurement are performed in each of the plurality of second areas.

30. The photometric device according to claim 28 or 29, wherein a detection element for performing distance measurement also performs photometry.

31. The photometric device according to any of claims 28 and 29, wherein said correcting means corrects the reference value on the basis of a proportion of the plurality of second areas including the object.

32. The photometric device according to any of claims 28 and 29, comprising a plurality of photoelectric conversion means arranged on the overall area where photometry can be performed, wherein a sum of outputs from photoelectric conversion means included in the first area or a value corresponding to an output indicating the lowest luminance of the outputs from the photoelectric conversion means included in the first area is used as the photometric result in the first area, and wherein values corresponding to the outputs from the respective photoelectric conversion means included in the first area are used as the photometric results in the plurality of second areas.

33. The photometric device according to any of claims 28 and 29, wherein said determination means determines that a backlight state exists when a difference greater than a predetermined reference value exists between the photometric result in the first area and the photometric result in the peripheral area around the first area.

34. The photometric device according to 33, comprising a plurality of photoelectric conversion means arranged on the overall area where photometry can be performed, wherein a sum of outputs from photoelectric conversion means included in the first area or a value corresponding to an output indicating the lowest luminance of the outputs from the photoelectric conversion means included in the first area is used as the photometric result in the first area, and wherein a value corresponding to a sum of outputs from photoelectric conversion means other than the photoelectric conversion means included in the first area is used as the photometric result in the peripheral area.

35. The photometric device according to any of claims 28 and 29, wherein backlight is determined when a difference greater than a predetermined reference value exists between the photometric result in the first area and the photometric result in the overall area.

36. The photometric device according to claim 35, comprising a plurality of photoelectric conversion means arranged on the overall area where photometry can be performed, wherein a sum of outputs from photoelectric conversion means included in the first area or a value corresponding to an output indicating the lowest luminance of the outputs from the photoelectric conversion means included in the first area is used as the photometric result in the first area, and wherein a value corresponding to a sum of outputs from the photoelectric conversion means in the overall area is used as the photometric result in the overall area.

37. The photometric device according to claim 32, wherein a value corresponding to a sum of outputs from photoelectric conversion means included in the first area is used as the photometric result in the first area when at least one of the outputs from the photoelectric conversion means is less than a predetermined value, and a value corresponding to an output indicating the lowest luminance of the outputs from the photoelectric conversion means included in the first area is used as the photometric result in the first area when all the outputs from the photoelectric conversion means are greater than the predetermined value.

38. A camera comprising said photometric device according to any of claims 1 to 3, 10 to 12, 18, 19, 28 and 29, wherein operations for taking pictures are controlled on the basis of at least one of the photometric result in the first area and the backlight determination result.

* * * * *

UNITED STATES PATENT AND TRADEMARK OFFICE
CERTIFICATE OF CORRECTION

PATENT NO. : 6,944,398 B2  
APPLICATION NO. : 10/066650  
DATED : September 13, 2005  
INVENTOR(S) : Masanori Ohtsuka Page 1 of 1

It is certified that error appears in the above-identified patent and that said Letters Patent is hereby corrected as shown below:

ON THE TITLE PAGE, AT ITEM (57), ABSTRACT  
Line 9, "a" should read --whether a--.  
Line 10, "exist" should read --exists--.  
Line 12, "a backlight state" should read --whether a backlight state--.  
Line 13, "exist" should read --exists--.  
Line 21, "atate" should read --state--.

THE DRAWINGS  
Figure 2 in Step S110, "DETERMINATE" should read --DETERMINE--.  
Figure 3 in Step S211, "DETERMINATE" should read --DETERMINE--.  
Figure 6 in Step S309, "DETERMINATE" should read --DETERMINE--.  
Figure 8 in Step S409, "DETERMINATE" should read --DETERMINE--.  
Figure 9 in Step S510, "DETERMINATE" should read --DETERMINE--.  
Figure 10, "SENSER" should read --SENSOR--.

COLUMN 11  
Line 13, "It" should read --it--.

COLUMN 17  
Line 45, "area" should read --area;--.

Signed and Sealed this

First Day of August, 2006

JON W. DUDAS  
*Director of the United States Patent and Trademark Office*